(12) United States Patent
Rehwald

(10) Patent No.: US 9,683,532 B2
(45) Date of Patent: Jun. 20, 2017

(54) HOLDER FOR FASTENING A TUBULAR COMPONENT TO AN ATTACHMENT STRUCTURE

(71) Applicant: Robert Bosch GmbH, Stuttgart (DE)

(72) Inventor: Andreas Rehwald, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/427,253

(22) PCT Filed: Jul. 17, 2013

(86) PCT No.: PCT/EP2013/065055
§ 371 (c)(1),
(2) Date: Mar. 10, 2015

(87) PCT Pub. No.: WO2014/040777
PCT Pub. Date: Mar. 20, 2014

(65) Prior Publication Data
US 2015/0240768 A1    Aug. 27, 2015

(30) Foreign Application Priority Data

Sep. 13, 2012  (DE) ........................ 10 2012 216 236

(51) Int. Cl.
*F16L 3/227*     (2006.01)
*F02M 55/04*     (2006.01)
(Continued)

(52) U.S. Cl.
CPC .......... *F02M 55/04* (2013.01); *F02M 55/025* (2013.01); *F16L 3/10* (2013.01);
(Continued)

(58) Field of Classification Search
CPC . F16L 3/2235; F16L 3/227; F16L 3/26; F16L 3/12; F16L 3/08; F16L 3/02;
(Continued)

(56) References Cited

U.S. PATENT DOCUMENTS 2,347,885 A * 5/1944 Crickmer ................ E21B 17/10
                                                        254/389
2,355,742 A * 8/1944 Morehouse ........... F16L 3/2235
                                                        174/40 CC (Continued)

FOREIGN PATENT DOCUMENTS

CN      101421507 A    4/2009
DE      3708864 A1     9/1988
(Continued)

OTHER PUBLICATIONS

International Search Report for PCT/EP2013/065055, dated Oct. 21, 2013.

*Primary Examiner* — Nkeisha Smith
(74) *Attorney, Agent, or Firm* — Gerard Messina

(57) ABSTRACT

A holder for fastening a manifold of a fuel distributor to an attachment structure includes: a first half shell; a second half shell; a first elastically deformable damping element provided on a retaining region of the first half shell; and a second elastically deformable damping element provided on a retaining region of the second half shell. The half shells are joined to each other for fastening the manifold to the attachment structure, in such a way that the half shells enclose the tubular component and retain the tubular component by the elastic damping elements. The two half shells are joined to each other by a film hinge.

4 Claims, 3 Drawing Sheets

(51) Int. Cl.
*F02M 55/02* (2006.01)
*F16L 3/10* (2006.01)
*F16L 55/035* (2006.01)

(52) U.S. Cl.
CPC ........... *F16L 3/1075* (2013.01); *F16L 3/1091* (2013.01); *F16L 55/035* (2013.01); *F02M 2200/306* (2013.01)

(58) Field of Classification Search
CPC .... F16L 3/04; F16L 3/223; F16L 3/23; F02M 55/04; F02M 55/025; F02M 2200/306
USPC ............................................... 248/68.1, 74.1
See application file for complete search history.

(56) References Cited

U.S. PATENT DOCUMENTS

| | | | | | |
|---|---|---|---|---|---|
| 2,404,531 | A | * | 7/1946 | Robertson | F16L 3/2235 138/106 |
| 2,695,770 | A | * | 11/1954 | Stone | E21B 19/02 15/220.4 |
| 4,029,276 | A | * | 6/1977 | Zielie | F16L 3/10 248/74.1 |
| 4,260,123 | A | * | 4/1981 | Ismert | F16L 3/12 174/166 R |
| 4,286,777 | A | * | 9/1981 | Brown | B60G 99/004 248/635 |
| 4,881,705 | A | | 11/1989 | Kraus | |
| 5,098,047 | A | * | 3/1992 | Plumley | F16L 3/2235 248/68.1 |
| 5,257,768 | A | * | 11/1993 | Juenemann | F16L 55/035 248/604 |
| 5,261,633 | A | * | 11/1993 | Mastro | F16L 3/18 248/68.1 |
| 5,384,936 | A | * | 1/1995 | Van Walraven | F16L 3/12 24/279 |
| 5,941,653 | A | * | 8/1999 | Cipriani | B60M 1/20 403/338 |
| 6,135,398 | A | * | 10/2000 | Quesnel | H02G 7/053 248/74.1 |
| 6,164,604 | A | * | 12/2000 | Cirino | F16L 3/1075 248/74.3 |
| 6,234,277 | B1 | * | 5/2001 | Kaczmarek | B66B 7/06 174/42 |
| 6,340,142 | B1 | * | 1/2002 | Li | F16L 3/08 248/313 |
| 6,666,415 | B2 | * | 12/2003 | Hansen | F16B 2/06 248/74.1 |
| 6,892,990 | B2 | * | 5/2005 | Pisczak | H02G 7/053 248/62 |
| 7,119,275 | B2 | * | 10/2006 | Suzuki | H02G 3/0691 138/108 |
| 7,150,438 | B2 | * | 12/2006 | Schaty | F16L 3/1008 248/74.1 |
| 7,467,767 | B2 | * | 12/2008 | Miles | F16L 3/1008 174/42 |
| 7,530,536 | B2 | * | 5/2009 | Hashimoto | F16L 3/2235 211/59.4 |
| 7,591,246 | B2 | * | 9/2009 | Beardmore | F02M 55/025 123/456 |
| 7,770,848 | B2 | * | 8/2010 | Johnson | F16L 3/1207 248/65 |
| 9,059,578 | B2 | * | 6/2015 | Sokolowski | G02B 6/4471 |
| 9,112,341 | B2 | * | 8/2015 | Eshima | H02G 3/32 |
| 2008/0246279 | A1 | * | 10/2008 | van Walraven | F16L 3/1016 285/420 |
| 2013/0187013 | A1 | * | 7/2013 | Minami | B64D 37/005 248/70 |
| 2014/0151514 | A1 | * | 6/2014 | Asai | B60R 16/0215 248/74.1 |
| 2015/0115110 | A1 | * | 4/2015 | Makainai | A01D 34/4166 248/68.1 |

FOREIGN PATENT DOCUMENTS

| | | |
|---|---|---|
| DE | 19750284 A1 | 5/1999 |
| DE | 10 2007 020498 | 10/2007 |
| DE | 102007036500 A1 | 2/2009 |
| EP | 0838626 B1 | 4/1998 |
| EP | 0 838 626 B1 | 7/2003 |
| EP | 1 701 076 | 9/2006 |
| EP | 2495427 A1 | 9/2012 |
| WO | WO 2008/064970 | 6/2008 |

\* cited by examiner

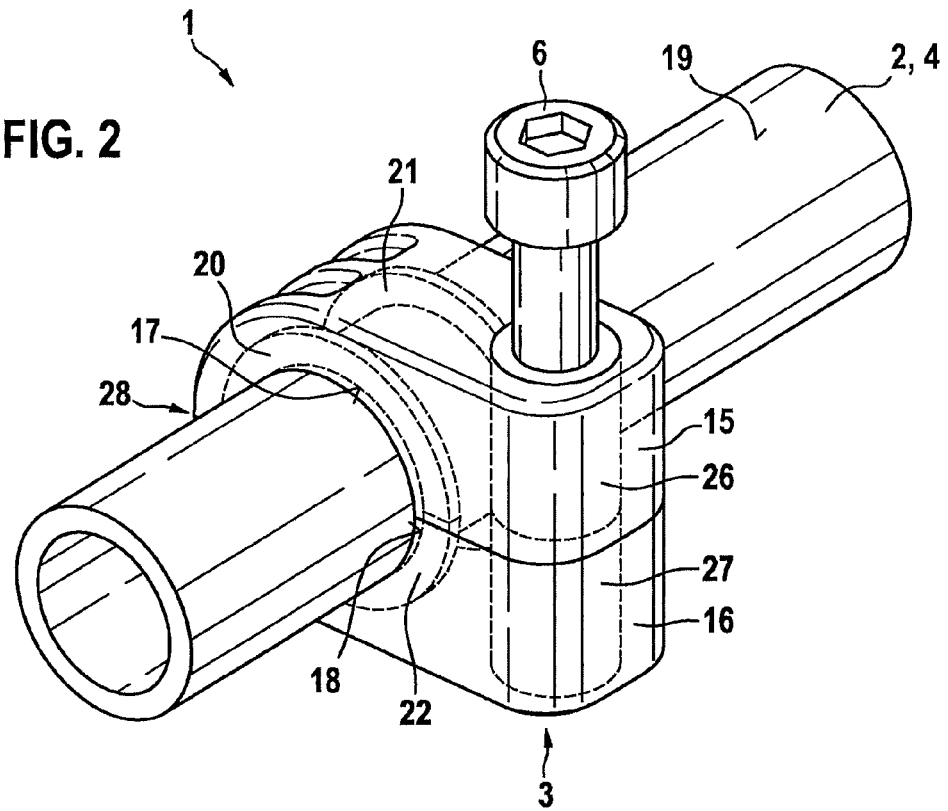
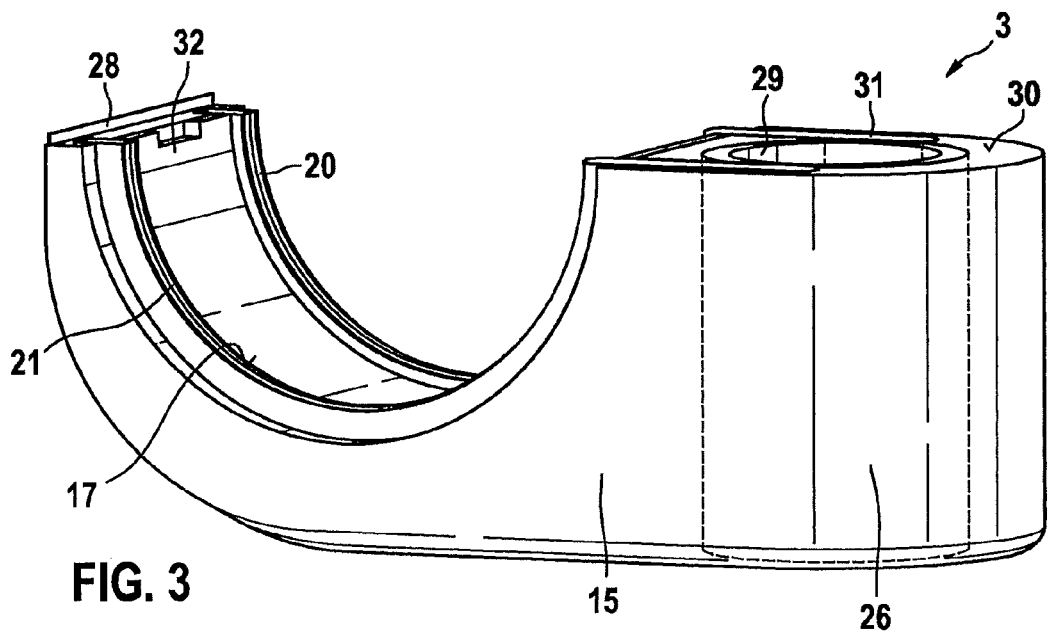

HOLDER FOR FASTENING A TUBULAR COMPONENT TO AN ATTACHMENT STRUCTURE

BACKGROUND OF THE INVENTION

1. Field of the Invention

The present invention relates to a holder for fastening a tubular component, especially a manifold of a fuel distributor, to an attachment structure. More specifically, the present invention relates to the field of fuel-injection systems of internal combustion engines.

2. Description of the Related Art

A vibration-isolated fuel distributor system for an internal combustion engine is known from the U.S. Pat. No. 7,591,246 B2. In one possible known development, a first and a second holder component are provided. An annular isolation part, which is situated between the receptacles of the holder elements in the installed state, is placed around a tubular manifold, the holder elements retaining the manifold via the isolation element, and contact between the manifold and the holder elements being prevented. The fastening is realized by a fastening means, which extends through the holder elements and is fixed in place on the cylinder head.

The specific development for fastening the manifold to the cylinder head of the internal combustion engine known from U.S. Pat. No. 7,591,246 B2 has the disadvantage that a multitude of individual parts must be properly positioned on the manifold during the assembly and then fixed in place in the correct position. In addition, a large fastening force is acting directly on the holder elements. When the fastening means is tightened, a relative movement may occur between the holder elements, which is induced via the screw head and crushes the isolating element.

BRIEF SUMMARY OF THE INVENTION

The holder and the fuel-injection system according to the present invention have the advantage of providing an improved design.

The tubular component, especially the manifold of the fuel distributor, as well as the attachment structure is not part of the holder according to the present invention. The holder in particular can also be produced and sold independently of a tubular component or an attachment structure. Accordingly, the attachment structure is not part of the fuel-injection system according to the present invention. The fuel-injection system may be produced and sold separately from such an attachment structure, especially a cylinder head of an internal combustion engine.

The holder provides a cost-effective solution for fastening the manifold, and thus the fuel distributor, to a cylinder head of the cylinder machine, for example. A preassembly of the holder on the manifold is possible. In this way the fuel-injection system together with all the attachment components is able to be placed and screw-fitted during the engine manufacture. This allows a precise positioning of the fuel injectors in their receiving bores.

A particular advantage in this regard is the injection-molding of the damping elements onto the associated half shell. This produces a permanent connection between the damping element and the half shell, which simplifies the handling and transport when produced as a prefabricated part, for instance, and possible testing as well.

However, in particular when the damping element is produced from special materials, it may also be advantageous or even necessary to insert the damping element. Especially when the damping element is made from an elastomeric material, which cannot be injection-molded as a second component in the plastic injection-die casting method, a placement in the half shell is possible. In particular multiple damping elements, in the form of rubber strips, are insertable in the respective half shell.

The first half shell and the second half shell advantageously may have an at least approximately similar geometric design. However, a non-symmetrical development is possible as well. The first half shell and the second half shell are advantageously interconnected by means of a film hinge. In this way they form a single component, so to speak, which simplifies the handling and assembly. The connected half shells are then able to be folded around the manifold and fixed in place via a screw, or they are able to be clipped together using a snap contour. However, a development featuring separate half-shell designs is conceivable as well. Snap-in connections are an additional option, as is a combination of a screw-fit and a snap-in connection, but other connection options may be used as well.

If the elastically deformable damping element of the first half shell is injection-molded onto the retaining region of the first half shell, this damping element will always be optimally positioned in relation to the first half shell during the assembly. It also simplifies the handling because there is no need to position the damping element in a first step and then to fix it in place via a holder in a second step. The same applies to the damping element of the second half shell. In addition, the damping elements of the half shells optimally complement each other following the assembly. A possibly occurring relative movement between the half shells, provided this is possible to begin with, furthermore will not result in crushing of the damping elements as a matter of principle. This improves the method of functioning of the vibration isolation. One advantage of designing the respective half shell in one piece with the injection-molded damping element lies in the noise damping. The half shells may be based on a plastic material, and the damping elements may be produced from an elastomeric material.

Because the damping elements are developed from visco-elastic elastomer inserts, it is possible to obtain excellent noise decoupling, which greatly reduces the transmission to the attachment structure. Loads acting on the manifold are able to be absorbed quite well due to the realization of large contact areas as well as the elastomeric volumes. The stiffness of the connection can be optimally adjusted to the loads by varying the area and volume. The elastomeric bearing system avoids thermal stresses that occur in a rigidly screw-fitted system, so that the manifold is subjected to lower stresses and may have a lighter design. The use of half shells preferably made of plastic preferably takes place in conjunction with a fixed connection of the fuel injectors to the manifold. Multiple holders for fastening a manifold are preferably provided.

It is advantageous that the elastically deformable damping element, which is injection-molded onto the retaining region of the first half shell or inserted in the retaining region, has a partially annular design and/or is developed in the form of a strip or lip or a full surface, and/or that the elastically deformable damping element injection-molded onto or inserted in the retaining region of the second half shell has a partially annular design and/or is developed in the form of a strip or lip or a full surface. This has the further advantage that the elastically deformable damping element which is injection-molded onto the retaining region of the first half shell, and the elastically deformable damping element which is injection-molded onto the retaining region of the second half shell surround the tubular component in the form of a ring when the first half shell and the second half shell are joined together for fastening the tubular component. This makes it possible to fasten the tubular component to the internal combustion engine or some other attachment structure in a reliable manner. Especially reliable fastening is achievable also along the longitudinal axis of the tubular component. Improved vibration damping is obtained in addition.

It is also advantageous that a plurality of elastically deformable damping elements are injection-molded onto and/or inserted in the retaining region of the first half shell and/or that a plurality of elastically deformable damping elements are injection-molded onto and/or inserted in the retaining region of the second half shell. This in particular makes it possible to injection-mold two or more strip- or lip-shaped damping elements onto one half shell in each case.

Moreover, it is advantageous that a metallic sleeve is situated in the first half shell and extrusion-coated, and a metallic sleeve is situated in the second half shell and extrusion-coated. This makes it possible to use metallic sleeves, which are extrusion-coated, as metallic inserts in the half shells for the feed-through of the screw. The preassembly of the screw in the pre-assembly position is optionally realized via a likewise injection-molded retaining geometry of the elastomeric component of the damping element or of the plastic component of the half shell, especially in the form of retaining webs. As a result, the screw is advantageously able to be positioned in a preassembly position in the metallic sleeve of the first half shell with the aid of a retaining web of the first half shell or by an injection-molding process using the material of the damping element. This further simplifies the handling or the installation of the holder on the manifold.

Another possibility is a development that uses two screws per holder for fastening the tubular component to the cylinder head or to some other attachment structure. This system provides a better distribution of the loads to two screws in the individual application case. It is therefore advantageous to place and extrusion-coat a further metallic sleeve in the first half shell, to place the metallic sleeve and the further metallic sleeve of the first half sleeve opposite each other in relation to the elastic damping element, and to place and extrusion-coat a further metallic sleeve in the second half shell and to place the metallic sleeve and the further metallic sleeve of the second half shell opposite each other in relation to the elastic damping element.

Using only shaping production methods, it is also possible for the holder structure to optimally utilize or fill up the available space. The shaping in the injection-molding process makes it possible to develop the half shells in such a way that the inherent stability is adapted to the loads that arise. This is made possible by reinforcements, in particular. Especially reinforcement ribs may be provided, which result in a lessening of the component stresses.

Preferred exemplary embodiments of the present invention are described in greater detail in the following description with reference to the attached figures, where corresponding elements have been provided with matching reference numerals.

BRIEF DESCRIPTION OF THE DRAWINGS

FIG. 2 shows an excerpted, three-dimensional illustration of the fuel-injection system shown in FIG. 1, according to a first exemplary embodiment of the present invention, during the assembly.

FIG. 3 shows a half shell of the holder shown in FIG. 2, in a three-dimensional view according to a second exemplary embodiment of the present invention.

DETAILED DESCRIPTION OF THE INVENTION

Figure 1:
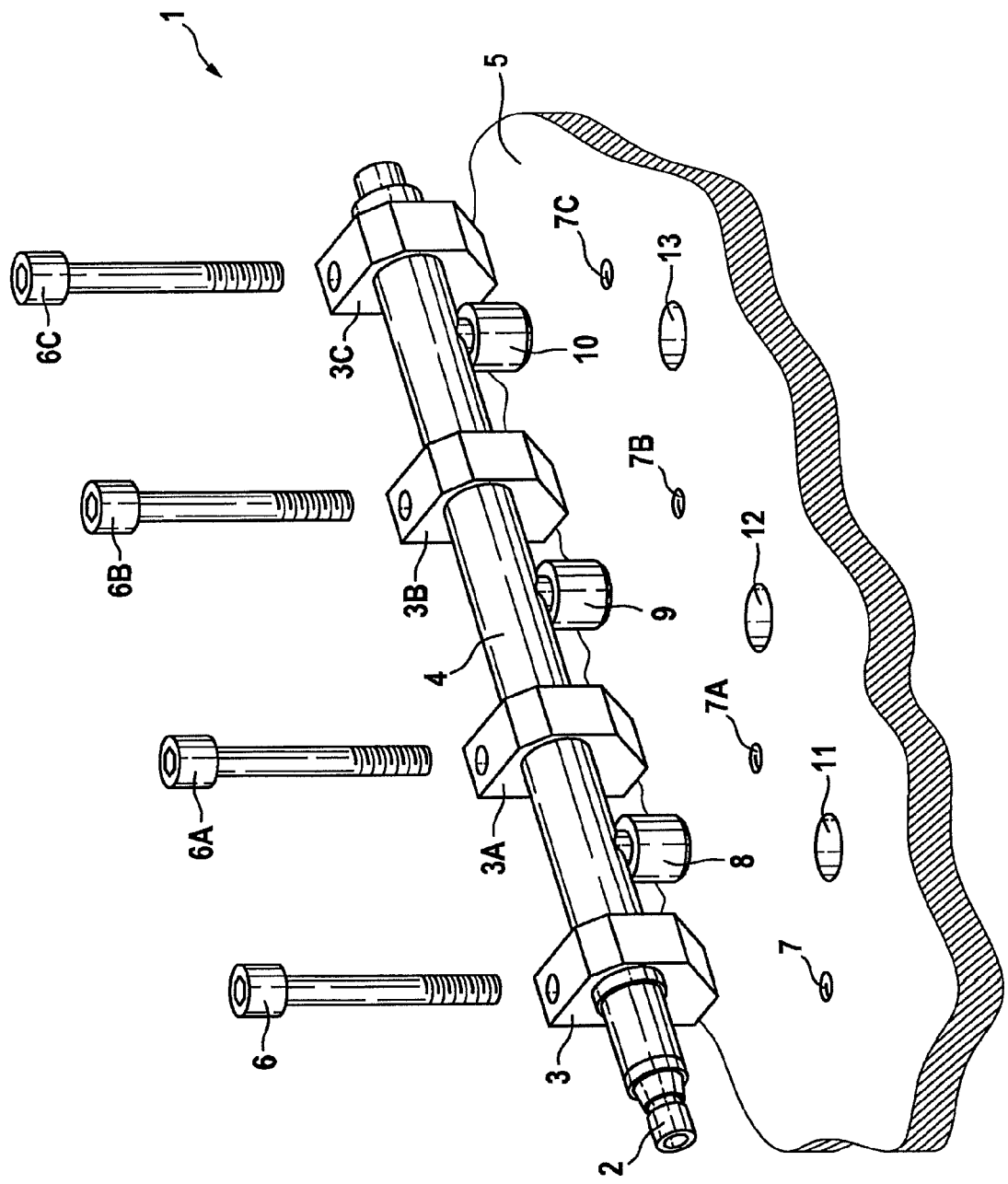
FIG. 1 shows a fuel-injection system having a manifold and a plurality of holders, which are used for fastening the manifold to an attachment structure, in a schematic three-dimensional illustration according to one possible development of the present invention.

FIG. 1 shows a fuel-injection system 1 having a fuel distributor 2 and multiple holders 3, 3A, 3B, 3C, which are used to fasten a manifold 4 of fuel distributor 2 to a schematically illustrated attachment structure 5, in a schematic, three-dimensional illustration according to one possible development. In this case, holder 3 includes a screw 6 by which holder 3 is able to be screwed to attachment structure 5. Accordingly, further screws 6A, 6B, 6C of holders 3A, 3B, 3C are provided, for which purpose attachment structure 5 includes threaded bores 7, 7A, 7B, 7C. In this exemplary embodiment, three cups 8, 9, 10 are provided on manifold 4, which are used to connect the fuel injectors (not shown). Such fuel injectors are able to be partially inserted into bores 11, 12, 13 of attachment structure 5. In this case, attachment structure 5 is cylinder head 5 of an internal combustion engine. Other developments are conceivable, however, so that attachment structure 5 is not restricted to a cylinder head or an internal combustion engine. Furthermore, fuel injectors can also be connected to manifold 4 in some other manner than by illustrated cups 8, 9, 10. In addition, it is also possible to mount a further manifold on the same internal combustion engine. In this way fuel-injection system 1 can be developed for an engine having six cylinders, for example.

As a result, manifold 2 is able to be fastened to attachment structure 5 in a reliable manner by means of holders 3, 3A, 3B, 3C. The number of holders 3, 3A, 3B, 3C can be selected as required in the individual application case. Hereinafter the development of holder 3 according to possible exemplary embodiments will be explained in greater detail. Depending on the application case, multiple holders 3 of this type may be used, either identical holders 3 or different holders 3. In addition, such holders 3 are also suitable for fastening other tubular components to an appropriate attachment structure 5.

FIG. 2 shows an excerpted, three-dimensional view of fuel-injection system 1 illustrated in FIG. 1, according to a first exemplary embodiment of the present invention, during the assembly. Holder 3 has a first half shell 15 and a second half shell 16. First half shell 15 includes a retaining region 17, and second half shell 16 has a retaining region 18. Via their retaining regions 17, 18 half shells 15, 16 enclose an outer side 19 of manifold 4. However, there is no direct contact between half shells 15, 16 and manifold 4.

Elastically deformable damping elements 20, 21 are injection-molded onto retaining region 17 of first half shell 15. In the assembled state, first half shell 15 therefore acts on outer side 19 of manifold 4, via damping elements 20, 21.

Accordingly, a damping element 22 and a further damping element (not shown) are joined to retaining region 18 of second half shell 16. Via these damping elements 22, second half shell 16 acts on outer side 19 of manifold 4, once holder 3 is assembled.

Damping elements 20, 22 are developed in the shape of a partial ring and in the assembled state jointly form a ring, which encloses outer side 19 of manifold 4. Accordingly, damping element 21 and the further damping element (not shown) form a ring as well.

Screw 6 is in a preassembly position, which is illustrated in FIG. 2. The positioning of screw 6 in the preassembly position is realized by a retaining web of first half shell 15 or by an injection molding using the material of damping elements 20, 21.

In addition, each half shell 15, 16 has a metallic sleeve 26, 27, respectively, which is situated inside half shells 15, 16 and extrusion-coated. Metallic sleeves 26, 27 further improve the stability of the fastening. By screw-fitting screw 6, half shells 15, 16 are acting on each other and are connected to attachment structure 5.

In this exemplary embodiment, first half shell 15 and second half shell 16 have the same geometrical design. Half shells 15, 16 may be developed as separate parts. However, half shells 15, 16 are preferably connected to each other via a film hinge 28.

FIG. 3 shows a half shell 15 of holder 3 illustrated in FIG. 2 in a three-dimensional view according to a second exemplary embodiment. The development is described with the aid of half shell 15. Half shell 16 may be developed accordingly. For example, it is possible to realize an injection-molding 29 on an inner side 30 of half shell 15 using the material of damping elements 20, 21. It is also possible to develop a retaining web 31 on half shell 15. Because of injection-molding 29 or retaining web 31, it is possible to provide a screw safety mechanism for the preassembly.

In this exemplary embodiment, each damping element 20, 21 has a plurality of lips. As a result, elastically deformable damping elements 20, 21, which are injection-molded onto retaining region 17 of half shell 15, are developed in the shape of a partial ring and lip. Furthermore, damping elements 20, 21 in this exemplary embodiment are connected to each other via the planar injection-molding 32 from the material of damping elements 20, 21.

In a corresponding manner, a full-surface development of a damping element may also be realized. Even a strip-shaped development, as described with the aid of FIG. 2, is possible. A combination of such developments is conceivable, as well.

In addition, a possible development of film hinge 28 on half shell 15 is illustrated in FIG. 3. Half shells 15, 16 are able to be connected to each other with the aid of film hinge 28.

Figure 4:
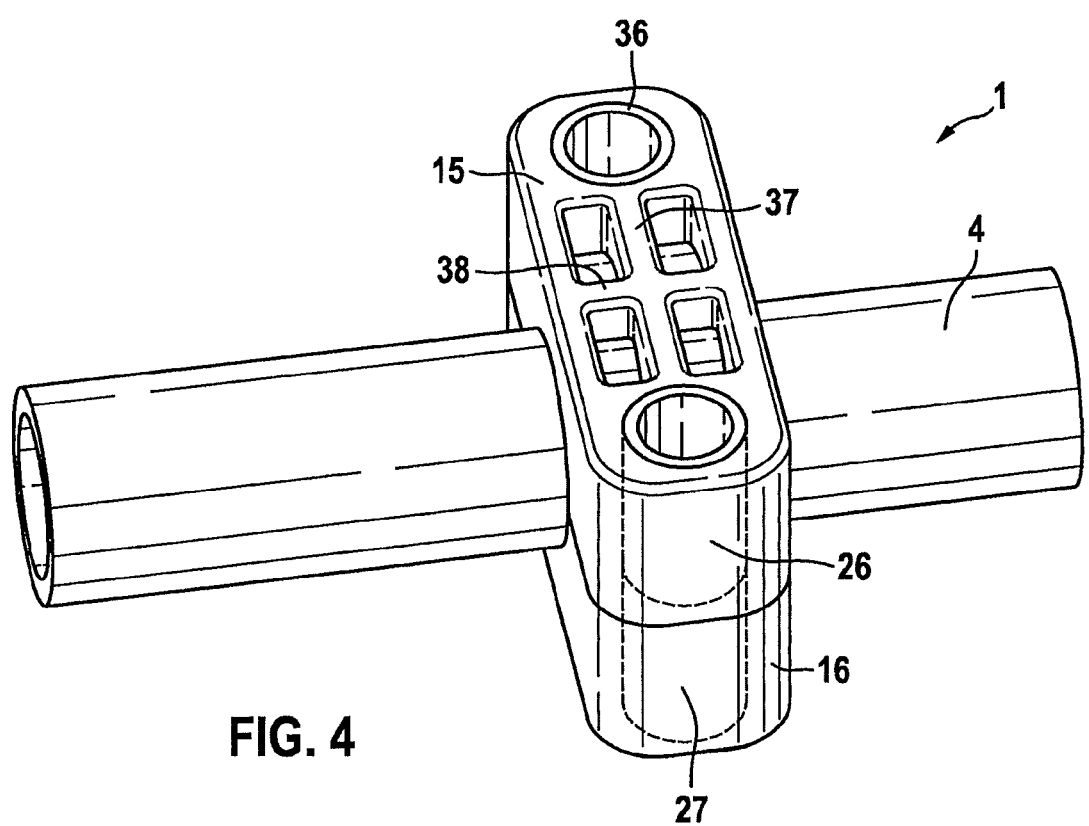
FIG. 4 shows the fuel-injection system shown in FIG. 2 in excerpted form, according to a third exemplary embodiment of the present invention.

FIG. 4 shows fuel-injection system 1 illustrated in excerpted form in FIG. 2 in a three-dimensional view according to a third exemplary embodiment. In this exemplary embodiment first half shell 15 is provided with metallic sleeve 26 and a further metallic sleeve 36. Accordingly, second half shell 16 is provided with a further metallic sleeve, which is not shown in FIG. 4. Further metallic sleeve 36 of first half shell 15 and further metallic sleeve of second half shell 16 are extrusion-coated using the material of half shells 15, 16 in each case. Metallic sleeve 26 and further metallic sleeve 36 of first half shell 15 are situated opposite each other with respect to the at least one elastic damping element 20, 21. In the assembled state, this means that metallic sleeve 26 and further metallic sleeve 36 are situated opposite each other with respect to held manifold 4. Accordingly, metallic sleeve 27 and the further metallic sleeve (not shown) of second half shell 16 are situated opposite each other with respect to the at least one elastic damping element 22 or manifold 4. The assembly is realized with the aid of two screws in this exemplary embodiment. At least one of these screws engages with attachment structure 5. This results in a better distribution of the loads.

Half shell 15 may furthermore include reinforcement ribs 37, 38, which lead to a reduction in the component stresses. Thus, the shaping in the injection-molding process makes it possible to develop or reinforce half shell 15 in such a way that the intrinsic stability is adapted to the occurring stresses. Second half shell 16 may be developed accordingly.

The present invention is not restricted to the exemplary embodiments described.

What is claimed is:

1. A holder for fastening a tubular manifold of a fuel distributor to an attachment structure, comprising:
   a first half shell;
   a second half shell;
   at least one first elastically deformable damping element provided one of in or on a retaining region of the first half shell;
   at least one second elastically deformable damping element provided one of in or on a retaining region of the second half shell;
   wherein the first half shell and the second half shell are joined to each other for attachment to said tubular manifold to the attachment structure, so that the first half shell and the second half shell can enclose said tubular manifold and for retaining said tubular manifold by the first and second elastic damping elements;
   wherein at least one of the following is satisfied:
      (i) the first elastically deformable damping element is configured in one of a partial ring, a lip, or a full surface form; and
      (ii) the second elastically deformable damping element is configured in one of a partial ring, a lip, or a full surface form;
   wherein the first half shell and the second half shell are substantially identical in terms of geometry,
   wherein the first half shell and the second half shell are interconnected by a film hinge,
   wherein the first and second elastically deformable damping elements come together to form a ring for enclosement of said tubular manifold when the first half shell and the second half shell are joined together for attachment to said tubular manifold, and
   wherein a screw is provided, which is secured in a preassembly position inside a first metallic sleeve of the first half shell by a retaining web of the first half shell or an injection-molding from a material of the first damping element.

2. The holder as recited in claim 1, wherein at least one of:
   multiple first elastically deformable damping elements are provided one of in or on the retaining region of the first half shell; and
   multiple second elastically deformable damping elements are provided one of in or on the retaining region of the second half shell.

3. The holder as recited in claim 1, wherein a first metallic sleeve is disposed and extrusion-coated in the first half shell, and a second metallic sleeve is disposed and extrusion-coated in the second half shell.

4. The holder as recited in claim 3, wherein:
   a further metallic sleeve is disposed in and extrusion-coated on the first half shell;

the first metallic sleeve and the further metallic sleeve of the first half shell are situated opposite each other with regard to the first elastic damping element;

the further metallic sleeve is disposed in and extrusion-coated on the second half shell; and the second metallic sleeve and the further metallic sleeve of the second half shell are situated opposite each other with respect to the second elastic damping element.

\* \* \* \* \*